May 9, 1967          F. Y. GREPE          3,319,142
DRIVE CONTROL INCLUDING PLURAL A.C. MOTORS COUPLED TO SAME
SHAFT WITH D.C. BRAKING
Filed May 7, 1965          4 Sheets-Sheet 1

United States Patent Office 3,319,142
Patented May 9, 1967

3,319,142
DRIVE CONTROL INCLUDING PLURAL A.C. MOTORS COUPLED TO SAME SHAFT WITH D.C. BRAKING
Frederick Yorke Grepe, Scarborough, Ontario, Canada, assignor, by mesne assignments, to A. O. Smith Corporation, Milwaukee, Wis., a corporation of New York.
Filed May 7, 1965, Ser. No. 469,014
25 Claims. (Cl. 318—48)

This application is a continuation-in-part of my application Ser. No. 82,856, filed Jan. 16, 1961, now abandoned.

This invention relates to a motor drive and control system and more particularly for motor and control systems for controlling the operation of hoists and like material handling devices.

In material handling of heavy loads, cranes and other hoist devices may employ appropriate electrical motors. Some systems employ direct current (D.C.) motors while others employ alternating current (A.C.) motors. In all systems, brake means must be provided to compensate for the inertia effects of the load which may tend to drive the handling mechanism.

The present invention is particularly directed to an improvement in the electrical motor drive system for heavy material equipment and particularly for cranes and other hoist devices. The invention is therefore particularly described in connection with a hoist system.

In hoist systems, it is desirous to control the speed of hoisting or lowering a load by a plurality of steps or points and to maintain the speed constant at each point completely independent of the weight of the load. In prior A.C. hoist systems, an eddy current braking device has been connected to the motor to serve as an artificial loading means. By energizing the eddy current brake differently for each speed point and inversely proportional to the weight of the load, the movement of the load can be maintained substantially constant at the desired speed for each speed point. Not only does this require that a motor be employed having the total horsepower capacity for moving the largest desired load, but also that the eddy current brake have a horsepower capacity at least equal to that of the motor. Eddy current brakes of this type and size are very expensive devices.

Alternately, dual motor systems have been suggested wherein a pair of induction motors are connected such that one delivers positive monitoring torque and the other of which delivers either positive motoring torque or electric braking torque.

Further, during the operation of the prior hoist schemes the motor was always driven at the same speed for each speed point and the energization of the eddy current brake was varied depending upon the load, so the combined load on the motor from the actual load and the eddy current brake was always the same for the same speed points. Thus, it is seen that the motor had to operate at the full load for each speed point. Not only does this unnecessarily load the motor, but also wastes the power used by the motor in driving against the braking torque produced by the brake and the power used by the brake in producing the braking torque.

It is therefore the main object of my invention to provide a two motor drive particularly suitable for hoist operation wherein the motors, singularly or jointly, may be connected to drive the load; or where one motor may be connected to drive the load and the other connected to brake movement of the load; or where the motors, singularly or jointly, may be connected to brake movement of the load.

The two motors employed are wound or squirrel cage induction motors in the above drive. Further, the braking motor is the equivalent of an eddy current brake and the drive can be designed to employ the induction motor as an eddy current brake. This will reduce the cost of providing various drives and increase the flexibility.

It is another object of my invention to provide a two motor drive of moderate cost and inexpensive to operate.

It is a further object of my invention to provide a unique and novel control system for a two motor drive.

It is still another object of my invention to provide a hoist control system wherein a motor is connected to drive the load in the hoist direction before the friction brake holding the load is released.

It is still a further object of my invention to provide a hoist control system wherein a motor is connected to provide a braking torque against the lowering of the load before the friction brake holding the load is released.

Still another object of my invention is to provide a two motor hoist control system having series connected overhoist limit switch contacts and operable to open the circuit energizing both motors when operating in the hoisting direction.

In one embodiment of my invention, two A.C. motors are connected in tandem with a load and each motor has variable impedance means connected in its rotor circuit. The motors are chosen having the same general characteristics and with the sum of their individual horsepower equal to the total horsepower required for the hoist. It has been found for the application of two motor drives to hoists, it is most advantageous to have a main motor with two thirds of the total horsepower requirements and an ancillary motor with one third of the total horsepower requirements. That is; for a 75 horsepower hoist, the main motor would be a 50 horsepower motor and the ancillary motor a 25 horsepower motor. However, any other practical combination of the horsepower ratings for the main and ancillary motor can be used depending upon the required number of speed points and the desired speeds thereat. In particular to minimize cost and maintain flexibility, motors of equal rating are provided to provide complete interchangeability of motors and connection of the auxiliary as a motor or an eddy current brake.

The operation of the motors is controlled by a control system which connects them to drive the load in the desired direction and/or to provide a braking torque against the movement of the load. The motors; for example, may advantageously be connected in any of the following combinations: both motors drive the load; one motor drievs the load alone; one motor drives the load while the other motor provides braking torque to the movement of the load similar to an eddy current brake; one motor provides braking torque to the movement of the load alone; or both motors provide braking torque to the movement of the load. It is obvious that in the practical applications of two motor drives to hoists, all of the above combinations will not normally be required and in an alternative arrangement the one motor may be permanently connected as an eddy current brake.

The braking torque is achieved by having the stator of the braking motor energized with a D.C. current. The rotor impedance of the braking motor may be changed for each speed point to change the amount of braking torque produced by a motor for a given value of D.C. current energization. The D.C. current can be obtained from a fixed D.C. source or from rectifying the A.C. current produced in the rotor circuit of the driving motor, or both. The D.C. current derived from the rotor circuit will vary directly with the speed at which the rotor is rotating which is the speed at which the load is moving. Here, by changing the rotor impedance for the different speed points, the braking torque produced will be dependent upon the speed point and the actual speed of the load.

The system also utilizes an electromechanical friction brake connected to the two motors and the load. When set, it stops and holds the load. The friction brake is connected to be energized by the control circuit only after the motors have been energized in the desired manner. When energized, the friction brake releases the motors and load, allowing the motors to rotate and the load to move.

A second embodiment of my invention entails having limit switch contacts connected in the supply mains energizing the motors in the hoisting direction. Should the load be hoisted too high, the limit switch contacts will open. This de-energizes the motors and sets the friction brake to hold the load.

Other novel features together with additional objects and advantages thereof will become apparent and obvious to those skilled in the art from the following description when read in connection with the accompanying drawings, in which.

Figures 1, 3:
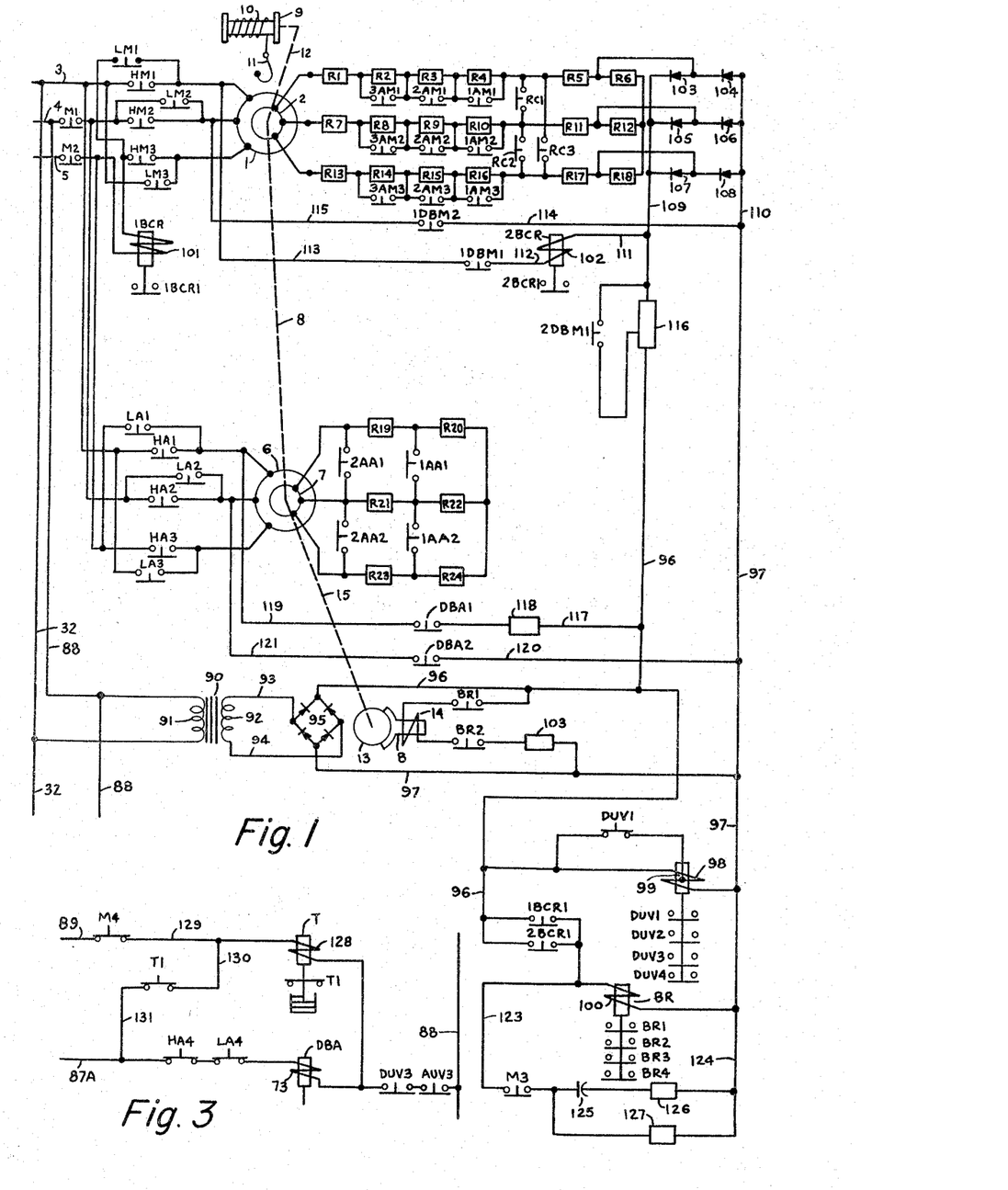
FIGURE 1 is an across-the-line schematic representation of the two motors, the friction brake and the energizing circuits therefor.
FIGURE 3 is an across-the-line schematic representation illustrating the contactors and their connections required in FIGURE 2 to obtain dynamic braking in the "off" position of the drum controller.

Referring to FIGURE 1, there is an alternating current main motor having a three phase stator 1 and a wound rotor 2 with a three phase external secondary circuit having in respective phases; resistance sections R1 to R6, R7 to R12, and R13 to R18.

Stator 1 is connectable to alternating current supply mains 3, 4 and 5 in which, respectively, are normally open contacts HM1, HM2 and HM3 of a magnetic contactor HM to be referred to. Also, normally open contacts M1 and M2 of a magnetic contactor M are connected in supply mains 4 and 5, respectively. When contactors M and HM are operated, their contacts close to energize stator 1 from supply mains 3, 4 and 5 and drive rotor 2 in the hoisting direction. Likewise, stator 1 may be connected to supply mains 3, 4 and 5 through the normally open contacts LM1, LM2 and LM3. When contactors M and LM are operated, their contacts close to energize stator 1 from supply mains 3, 4 and 5 and drive rotor 2 in the lowering direction.

Supply mains 3, 4 and 5 are respectively connectable to a stator 6 of an ancillary motor through normally open contacts HA1, HA2 and HA3 of a contactor HA. The ancillary motor has a wound rotor 7 with a three phase external secondary circuit having in respective phases; resistance sections R19 and R20, R21 and R22, and R23 and R24. When contactors M and HA are operated, their contacts close to energize stator 6 and drive rotor 7 in the hoisting direction. Supply mains 3, 4 and 5 are also connectable to stator 6 by normally open contacts LA1, LA2 and LA3. When contactors M and LA are operated, their contacts close to energize stator 6 and drive rotor 2 in the lowering direction.

Rotor 2 and rotor 7 are connected together by a shaft which is diagrammatically represented by a dotted line 8.

Rotor 2 and rotor 7 are also connected to a hoist drum 9 having a cable 10 wound thereon with a hook 11 at one end of cable 10. The mechanical connection between hoist drum 9 and rotor 2 is diagrammatically represented by a dotted line 12.

Rotor 2 and rotor 7 are also connected to a drum 13 of a normally set friction brake B of known construction having an electromagnetic winding 14 for releasing friction brake B when energized. The mechanical connection between rotor 7 and drum 13 is diagrammatically represented by a dotted line 15.

Figure 2:
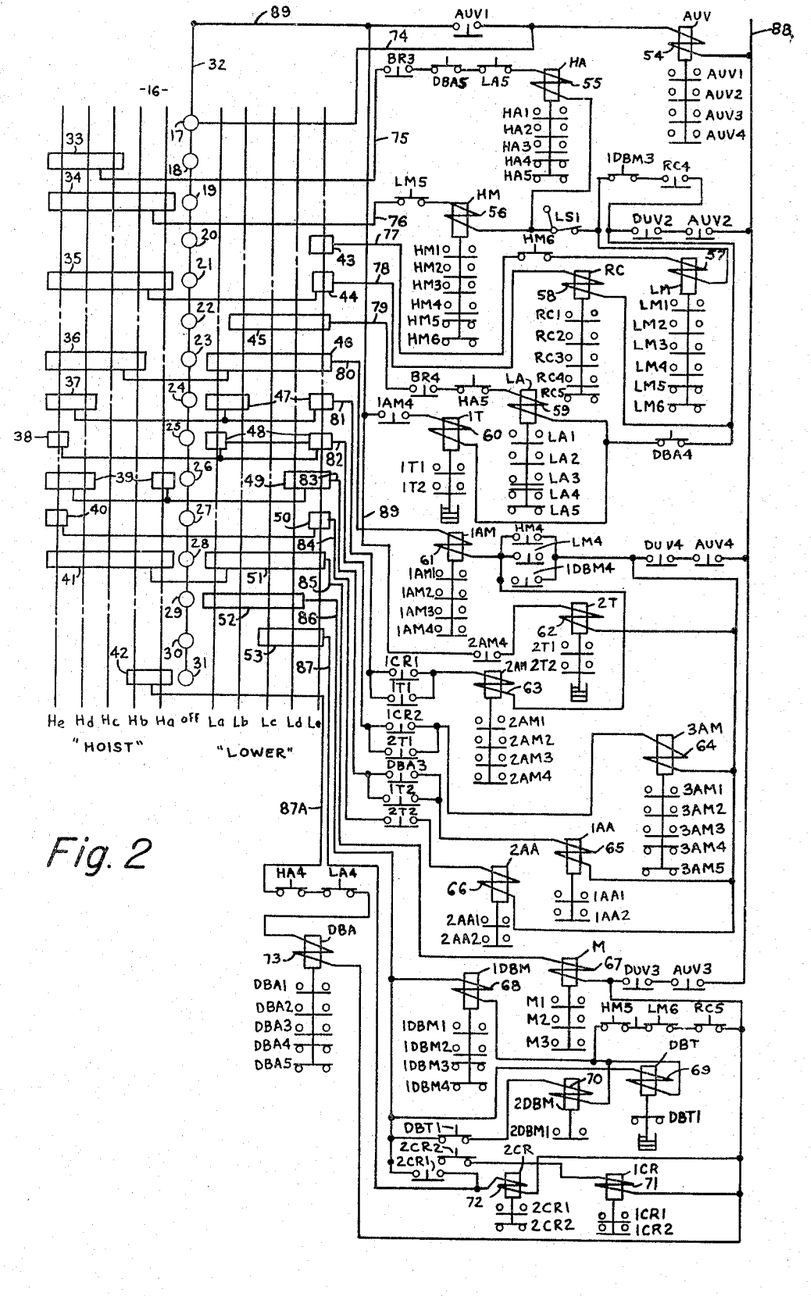
FIGURE 2 is an across-the-line schematic representation of the control circuit for the two motor drive when used on a hoist.

In FIGURE 2, there is generally shown at 16 a drum type controller which, in the diagrammatic illustration thereof, comprises movable contacts 17 to 31 all connected as shown. The contacts are connected by a wire 32 to supply main 3.

These contacts, as will be understood by those skilled in the art, are all movable in unison from the illustrated "off" position toward the left to five successive hoisting points points Ha to He. The contacts are also movable in unison from the "off" position to the right to five succession lowering points La to Le. These points are indicated by the vertical lines above the legends "HOIST" and "LOWER."

On the several hoisting points, contacts 18, 19, 21, 23 through 28 and 31 are engageable with stationary bars 33 through 42, respectively.

On the several lowering points, movable contacts 20 through 30 are engageable with stationary bars 43 through 53, respectively.

Drum controller 16 on the various hoisting and lowering points operates and restores electromagnetic contactors as follows.

A contactor AUV having a winding 54 and normally open contacts AUV1 to AUV4.

A contactor HA having a winding 55 and normally open contacts HA1 to HA3 and normally closed contacts HA4 and HA5.

A contactor HM having a winding 56 and normally open contacts HM1 to HM4 and normally closed contacts HM5 and HM6.

A contactor LM having a winding 57 and normally open contacts LM1 to LM4 and normally closed contacts LM5 and LM6.

A contactor RC having a winding 58 and normally open contacts RC1 to RC4 and a normally closed contact RC5.

A contactor LA having a winding 59 and normally open contacts LA1 to LA3 and normally closed contacts LA4 and LA5.

A timing contactor 1T having a winding 60 and normally open contacts 1T1 and 1T2.

A contactor 1AM having a winding 61 and normally open contacts 1AM1 to 1AM4.

A timing contactor 2T having a winding 62 and normally open contacts 2T1 and 2T2.

A contactor 2AM having a winding 63 and normally open contacts 2AM1 to 2AM4.

A contactor 3AM having a winding 64 and normally open contacts 3AM1 to 3AM3 and normally closed contacts 3AM4 and 3AM5.

A contactor 1AA having a winding 65 and normally open contacts 1AA1 and 1AA2.

A contactor 2AA having a winding 66 and normally open contacts 2AA1 and 2AA2.

A contactor M having a winding 67 and normally open contacts M1 to M3.

A contactor 1DBM having a winding 68 and normally open contacts 1DBM1 and 1DBM2 and normally closed contacts 1DBM3 and 1DBM4.

A timing contactor DBT having a winding 69 and a normally closed contact DBT1.

A contactor 2DBM having a winding 70 and a normally open contact 2DBM1.

A contactor 1CR having a winding 71 and normally open contacts 1CR1 and 1CR2.

A contactor 2CR having a winding 72 and a normally open contact 2CR1 and a normally closed contact 2CR2.

A contactor DBA having a winding 73 and normally open contacts DBA1 to DBA3 and normally closed contacts DBA4 and DBA5.

Timing contactors 1T, 2T and DBT are of well known construction whereby a time delay is provided after the energization of their windings and before the closing of their normally open contacts and the opening of their normally closed contacts. When their windings are deenergized, the contacts restore immediately to their normal position. The purpose of this time delay interval will be described hereinafter.

The windings of the aforementioned contactors are connected in an across-the-line type of diagram. The windings of the contactors connected to drum controller 16 comprises horizontal cross lines 74 to 87A with their right ends connected to a common wire 88. Wire 88 is connected to supply main 4 as is shown in FIGURE 1. Timing contactors 1T and 2T are connected at the left side of their windings 60 and 62 to a wire 89 which connects to wire 32. Their right side is connected to common wire 88.

A transformer 90 has a primary winding 91 connected to wires 32 and 88. It has a secondary winding 92 which is connected by wires 93 and 94 to a full wave rectifier 95. Connected to the output terminals of full wave rectifier 95 are wires 96 and 97.

A contactor DUV having a winding 98 and normally open contacts DUV1 to DUV4 is connected across wires 96 and 97. Winding 98 has a center tap 99 thereon.

A contactor BR having a winding 100 and normally open contacts BR1 to BR4 is also connected across wires 96 and 97.

A current operated contactor 1BCR having a winding 101 is connected in supply main 5 and has a normally open contact 1BCR1.

Another current contactor 2BCR having a winding 102 and a normally open contact 2BCR1 is connected as will be referred to.

The contactors are all illustrated in normally de-energized or restored condition. The contacts of these contactors are shown without connections thereto, but are reproduced elsewhere in the drawings with their connections to avoid complexity in the drawings.

The winding 14 of a friction brake B is connected across wires 96 and 97 by means of normally open contacts BR1 and BR2 and a resistor 103.

A three phase rectifier having individual rectifiers 103 to 108 is connected to be energized from the secondary circuit of rotor 2. The three phase rectifier is connected to the secondary circuit between resistors R5 and R6, R11 and R12, and R17 and R18. Wires 109 and 110 are connected to its output. Wire 109 is connected by a wire 111, winding 102 of current contactor 2BCR, a wire 112, contact 1DBM1 and a wire 113 to stator 1. Wire 110 is connected by a wire 114, contact 1DBM2 and a wire 115 to stator 1.

Wire 109 is also connected to wire 96 by a resistor 116. Contact 2DBM1 is connected to short out a portion of resistor 116 when closed.

Wire 110 is connected directly to wire 97.

Wire 96 is connected by a wire 117, a resistor 118, contact DBA1 and a wire 119 to stator 6.

Wire 97 is connected by a wire 120, contact DBA2 and a wire 121 to stator 6.

When power is supplied to supply mains 3, 4 and 5, transformer 90 is energized and full wave rectifier 95 has an output. Contactor DUV, being connected directly across wires 96 and 97, is energized and operates to close its contacts DUV1 to DUV4. Contact DUV1 in closing shorts out half of winding 98. This is an economy measure as is well known in the art of D.C. contactors.

With drum controller 16 in the "off" position, contact 17 is energized from wire 32 and thus, winding 54 of contactor AUV is energized through wire 74 to operate and close its normally open contacts AIV1 to AUV4. Contact AUV1 in closing connects winding 54 directly to wire 32 by wire 89.

On the first point hoisting H$a$, contactor RC is operated by current from contact 21 through bar contact 35, cross line 78, winding 58 of contactor RC, contact DUV2 and contact AUV2 to wire 88. When contactor RC operates, it closes its contacts RC1 to RC3 and opens contacts RC4 and RC5. The closing of contacts RC1 to RC3 connects the secondary circuit of rotor 2 in a star point between resistors R4 and R5, R10 and R11, and R16 and R17.

Contactor M is operated by current through contact 38, bar contact 41, cross line 85, winding 67 of contactor M, contact DUV3 and contact AUV3 to wire 88. Contactor M in operating closes its contacts M1 to M3.

Contactor DBA operates by current through contact 31, bar contact 42, cross line 87A, contact HA4, contact LA4, winding 73 of contactor DBA, contact DUV3 and contact AUV3 to wire 88. Contactor DBA in operating closes contacts DBA1 to DBA3 and opens contacts DBA4 and DBA5.

After contactor RC operates to close contact RC1, contactor HM operates by current through contact 19, bar contact 34, cross line 76, contact LM5, winding 56 of contactor HM, limit switch contact LS1, contact 1DBM3, contact RC1, contact DUV2 and contact AUV2 to wire 88. Contactor HM in operating closes its contacts HM1 to HM4 and opens its contacts HM5 and HM6.

After contactor DBA operates to close contact DBA1, contactor 1AA is operated by current from contact 26, bar contact 39, cross line 83, contact DBA3, winding 65 of contactor 1AA, contact DUV4 and contact AUV4 to wire 88. Contactor 1AA in operating closes contacts 1AA1 and 1AA2 to short resistance sections R20, R22 and R24 out from the secondary circuit of rotor 7.

The operating of contactor M and contactor HM connects stator 1 to supply mains 3, 4 and 5 by contacts M1 and M2 and HM1 to HM3. Current flowing through supply main 5 to stator 1 flows through winding 101 of current contactor 1BCR to operate it and close its contact 1BCR1.

Current can now flow from wire 96 through closed contact 1BCR1 and winding 100 of contactor BR to wire 97. Contactor BR in operating closes its contacts BR1 to BR4.

The closing of contacts BR1 and BR2 connects winding 14 of friction brake B directly across wires 96 and 97. Current flows from wire 96 through contact BR1, winding 14 of friction brake B, contact BR2 and resistor 103 to wire 97. Friction brake B operates to release rotors 2 and 7 so they can rotate. It is to be noted here that friction brake B cannot be released by this means until after stator 1 has been energized.

The main motor is now connected to the supply mains and operates in the hoisting direction while the ancillary motor is not connected to the supply mains. However, the aforedescribed operation of contactor DBA closed contacts DBA1 and DBA2 to connect stator 6 of the ancillary motor to wires 96 and 97. D.C. current flows from wire 96 through wire 117, resistor 118, contact DBA1, wire 119, stator 6, wire 121, contact DBA2 and wire 120 to wire 97. This D.C. current causes stator 6 to exert a braking torque against the driving action of rotor 2. In this mode of operation, the ancillary motor functions in the same manner as an eddy current brake and as hereinafter discussed for certain applications the ancillary motor may be connected as an eddy current brake only.

Thus, the main motor hoists the load while having high secondary resistance and the ancillary motor retards this hoisting action by the dynamic braking torque while rotor 7 has low secondary resistance. The load is thus hoisted at the slowest hoisting speed.

On moving drum controller 16 to the second point hoisting Hb, the operating conditions described for the first point hoisting Ha remain the same except that contactor 1AM is energized to short out resistance sections R4, R10 and R16 from the secondary circuit of rotor 2 and contactor 1AA is de-energized to reinsert resistance sections R20, R22 and R24 in the secondary circuit of rotor 7. Also, timing contactor 1T is energized to start its time interval. This is accomplished as follows:

Contactor 1AM is operated by current through contact 23, bar contact 36, cross line 80, winding 61 of contactor 1AM, contact HM4, contact DUV4 and contact AUV4 to wire 88. The operation of contactor 1AM closes contacts 1AM1 to 1AM4. The closing of contacts 1AM1, 1AM2 and 1AM3 shorts out resistance sections R4, R10 and R16, respectively, from the secondary circuit of rotor 2.

The closing of contact 1AM4 allows current to flow through wire 89, winding 60 of contactor 1T, contact DBA4, contact DUV2 and contact AUV2 to wire 88. This energization of winding 60 starts the running of the time interval, after the expiration of which contacts 1T1 and 1T2 close.

On going to the second point hoisting Hb, contact 26 leaves contact bar 39 to interrupt the current flowing through winding 65 of contactor 1AA. Contactor 1AA is de-energized to open contacts 1AA1 and 1AA2 which reinserts resistance sections R20, R22 and R24 in the secondary circuit of rotor 7.

The shorting out of resistance sections R4, R10 and R16 from the secondary circuit of rotor 2 allows the main motor to accelerate to a higher hoisting speed, even though the ancillary motor is still applying a braking torque due to its stator 6 being energized with D.C. current as was described for the first hoist position Ha. The reinsertion of resistance sections R20, R22 and R24 decreases the braking torque produced by the ancillary motor when stator 6 is energized with the same value of D.C. current. This allows the load to be hoisted at a faster speed.

On moving drum controller 16 to the third point hoisting Hc, the operating conditions described for the second point hoisting Hb remain the same for the main motor while the direct current energizing stator 6 of the ancillary motor is disconnected and the ancillary motor is connected to assist in hoisting the load. This is accomplished as follows:

On going to the third point hoisting Hc, contact 31 leaves bar contact 42 to de-energize winding 73 of contactor DBA. Contactor DBA restores to open contacts DBA1 to DBA3 and close contacts DBA4 and DBA5. The opening of contacts DBA1 and DBA2 disconnects stator 6 from wires 96 and 97 to discontinue its energization with D.C. current.

After contact DBA5 closes, current flows through contact 18, bar contact 33, cross line 75, contact BR3, contact DBA5, contact LA5, winding 55 of contactor HA, limit switch contact LS1, contact 1DBM3, contact RC4, contact DUV2 and contact AUV2 to wire 88. Contactor HA is operated to close contacts HA1 to HA3 and open contacts HA4 and HA5. The closing of contacts HA1 to HA3 connects stator 6 of the ancillary motor to be energized from supply mains 3, 4 and 5.

The ancillary motor now operates at its slow speed in the hoisting direction to assist the main motor so the combined effect of the two motors is to accelerate the hoisting of the load.

It is to be noted that when the two motors are driving the load together, it is essential that they operate at the same speed. This is accomplished by inserting the correct value of resistance connected in the secondary circuit of one of the motors. In the described embodiment resistance sections R1, R7 and R13 are connected in the secondary circuit of rotor 2 for this purpose.

On going to the fourth point hoisting Hd, the operating conditions described for the third point hoisting Hc remain the same and additional resistance sections are cut out of the secondary circuit of both the main motor and the ancillary motor by the operation of contactors 2AM and 1AA. This is accomplished as follows.

The movement of drum controller 16 to the fourth point hoisting Hd allows current to flow through contact 24, bar contact 37, cross line 81, contact 1T, winding 63 of contactor 2AM, contact HM4, contact DUV4 and contact AUV4 to wire 88. It is to be noted that contactor 2AM cannot be operated until after contact 1T has closed, which is after the elapse of the time interval of contactor 1T. Contactor 2AM operates to close contacts 2AM1 to 2AM4. The closing of contacts 2AM1, 2AM2 and 2AM3 short out resistance sections R3, R9 and R15, respectively, from the secondary circuit of rotor 2.

Likewise, the movement of drum controller 16 to the fourth point hoisting Hd allows current to flow through contact 26, bar contact 39, cross line 83, contact 1T2, winding 65 of contactor 1AA, contact DUV4 and contact AUV4 to wire 88. Like contactor 2AM, contactor 1AA cannot be operated until after timing contactor 1T has run its time interval to close contact 1T2. Contactor 1AA operates to close its contacts 1AA1 and 1AA2 to short out resistance sections R20, R22 and R24 from the secondary circuit of rotor 7.

The closing of contact 2AM4 allows current to flow through wire 89, contact 2AM4, winding 62 of timing contactor 2T, contact DUV4 and contact AUV4 to wire 88. The energization of winding 62 starts the running of the timed interval, after which, contacts 2T1 and 2T2 close.

Both the main and the ancillary motor now accelerate to a higher speed and hoist the load faster.

On going to the fifth point hoisting He, the conditions described for the fourth point hoisting Hd remain the same except that additional resistance sections are cut out of both the secondary circuits of the main and ancillary motor. This is accomplished as follows.

The movement of drum controller 16 to the fifth point hoisting He allows current to flow through contact 25, bar contact 38, cross line 82, contact 2T1, winding 64 of contactor 3AM, contact dUV4 and contact AUV4 to wire 88. It is to be noted that this current cannot flow until after the time interval for contactor 2T has elapsed and contact 2T1 has closed. Contactor 3AM is operated to close contacts 3AM1 to 3AM3 and open contacts 3AM4 and 3AM5. The closing of contacts 3AM1, 3AM2 and 3AM3 shorts out resistance sections R2, R8 and R14, respectively, from the secondary circuit of rotor 2. The main motor is thus allowed to accelerate to its maximum speed.

Likewise, the moving of drum controller 16 to the fifth point hoisting He allows current to flow through contact 27, bar contact 40, cross line 84, contact 2T2, winding 66 of contactor 2AA, contact DUV4 and contact AUV4 to wire 88. Again, this current cannot flow until timing contactor 2T has run its time interval and contact 2T2 has closed. Contactor 1AA operates to close its contacts 1A1 and 1A2 which short out resistance sections R19, R21 and R23 from the secondary circuit of rotor 7 causing the ancillary motor to accelerate to its maximum speed.

With the main and ancillary motor accelerating to their maximum speed, the hoisting load will also be accelerated to its maximum speed.

It is to be noted that in the first two points hoisting, the main motor operates to hoist the load while the ancillary motor is connecting to provide a retarding or braking torque. During the last three points hoisting, both motors are connected to hoist the load jointly and are accelerated by means of decreasing the resistance of their secondary circuits. Should it be desired to go from the "off" point to any one of the hoisting points, it can be done by moving drum controller 16 to the desired point and the motor or motors will accelerate to the selected speed by fully automatic operation of the panel. Timed acceleration will be obtained in the same manner that it was described for the movement from point-to-point.

Should the operator inadvertently hoist hook 11 and the load too high, the limit switch will trip to open limit switch contact LS1 in the old and well known manner.

The opening of contact LS1 opens the circuit energizing winding 55 of contactor HA and winding 56 of contactor HM so both contactors are restored.

When contactor HA restores, contacts HA1 to HA3 open and contacts HA4 and HA5 close. The opening of contacts HA1 to HA3 disconnects stator 6 from supply mains 3, 4 and 5 and the ancillary motor no longer hoists the load.

When contactor HM restores, contacts HM1 to HM3 open and contacts HM4 and HM5 close. The opening of contacts HM1 to HM3 disconnects stator 1 from supply mains 3, 4 and 5 and the main motor no longer hoists the load.

The opening of contact HM3 disconnects supply main 5 so no current flows through winding 101 of current contactor 1BCR and it restores to open contact 1BCR1.

The opening of contact 1BCR1 disconnects winding 100 of contactor BR from wires 96 and 97 and it restores to open contacts BR1 to BR4. The opening of contacts BR1 and BR2 disconnects winding 14 of friction brake B from wires 96 and 97 and friction brake B sets to stop and hold the load.

If limit switch contact LS1 should be opened while in the first or second point hoisting, Ha or Hb, contactor HM is restored and friction brake B set in the manner described. It is recalled that the ancillary motor for these hoisting points is supplying a dynamic braking torque. This dynamic braking torque will not be interrupted by the opening of limit switch contact LS1, but continues to assist in the stopping of the load.

Contact LS1 will remain open to prevent any further hoisting of the load and drum controller 16 must be moved to one of the lowering points to lower the load out of the limit switch to reset it and reclose contact LS1.

Figure 4:
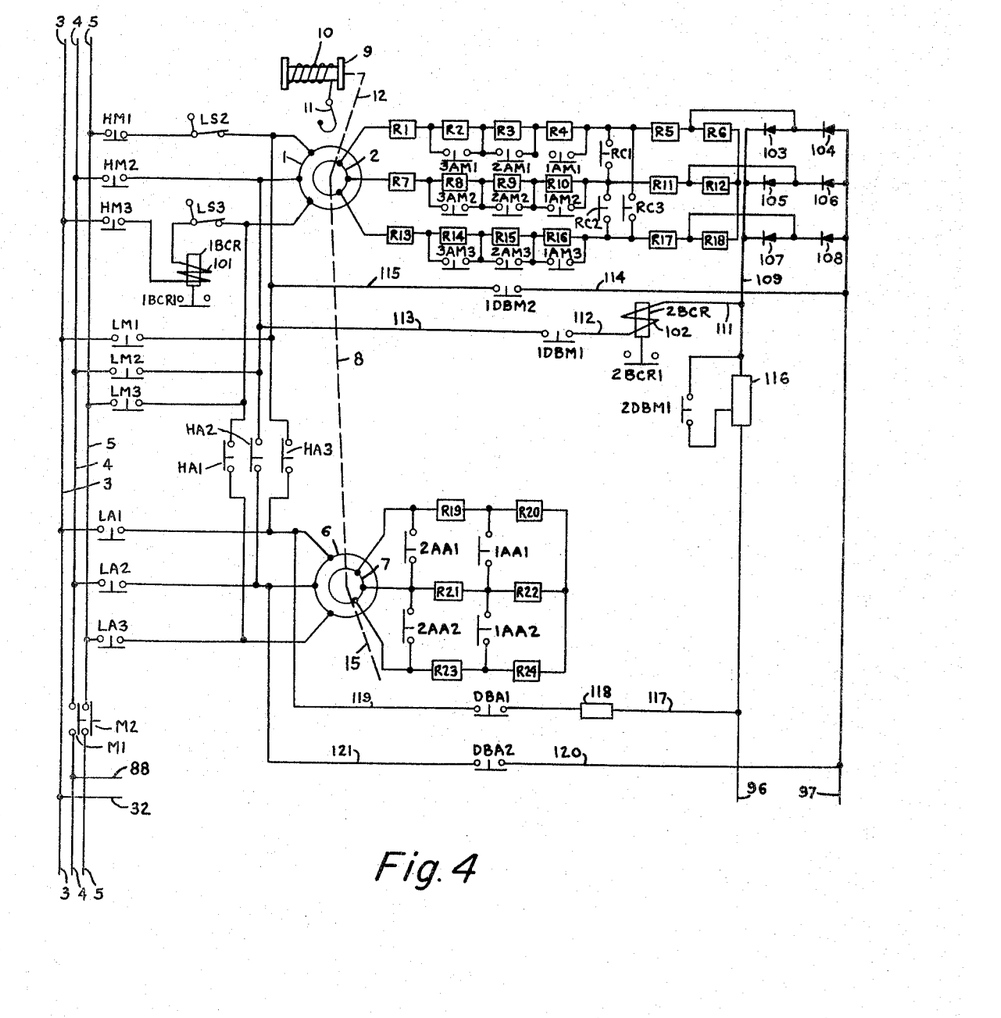
FIGURE 4 is an across-the-line schematic representation of the two motors and energizing circuits therefor with series connected overhoist limit switches.

In FIGURE 4, there is shown the connection necessary for the main and ancillary motor when series limit switch contacts are used. The same reference symbols and numerals are used to represent the identical items shown in FIGURE 1 even though they may be connected in a different manner. The friction brake circuit of FIGURE 1 is the same and will not be reproduced for sake of brevity.

The control circuit and its operation is the same for FIGURE 4 as for FIGURE 1. Therefore, on all of the hoist points, contactors M and HM are operated to close their contacts. Stator 1 is energized through their contacts and limit switch contacts LS2 and LS3 so the main motor operates in the hoisting direction.

Current contactor 1BCR operates and as described winding 13 of friction brake B is energized to release the motors and the load.

The ancillary motor is connected to operate in the same manner as described, i.e., to provide braking torque on the first two points and a hoisting torque on the last three points. However, when it is connected to supply the hoisting torque, it is energized through limit switch contacts LS2 and LS3.

Normally when limit switch contacts LS2 and LS3 are used, limit switch contact LS1 is not used. In some instances it is used as an emergency stop.

When hook 11 is raised too high, limit switch contacts LS2 and LS3 will open to disconnect stator 1 of the main motor and stator 6 of the oncillary motor from the supply mains. Therefore, neither motor can continue to supply a hoisting torque.

The opening of LS3 interrupts the flow of current through winding 101 of current contactor 1BCR and it becomes de-energized and contact 1BCR1 opens. As described, this causes contactor BR to restore de-energizing winding B and friction brake B sets to stop any further movement of the load.

The advantages and safety features from the use of the series connected limit switch contacts LS2 and LS3 are obvious since it is seen that they directly interrupt the current flowing to the motors.

Contacts LS2 and LS3 will remain open to prevent any further hoisting of the load and drum controller 16 must be moved to one of the lowering points to lower the load and hook 11 out of the limit switch. This will reset the limit switch and reclose contacts LS2 and LS3.

The operation of the circuit when drum controller 16 is moved to the right to the respective lowering positions will now be described.

On going from the "off" position to the first point lowering La, rectifier 95 and the secondary circuit of rotor 2 is connected to energize stator 1 with D.C. current. Stator 1 thus provides a compensated braking torque which is proportional to the speed at which the load overhauls the motor in its downward movement. This is accomplished as follows.

Contactor 1DBM is operated by current flowing through contact 29, bar contact 52, cross line 86, winding 68 of contactor 1DBM, contact HM5, contact LM6, contact RC5, contact DUV3 and contact AUV3 to wire 88. Contactor 1DBM operates to close contacts 1DBM1 and 1DBM2 and open contacts 1DBM3 and 1DBM4. The closing of contacts 1DBM1 and 1DBM2 connects stator 1 to be energized with a D.C. current from wires 109 and 110.

Also, current flows from wire 86 through winding 69 of timing contactor DBT, contact HM5, contact LM6, contact RC5, contact DUV3 and contact AUV3 to wire 88. After the time interval for timing contactor DBT has elapsed, its contact DBT1 will open.

At the same time, current flows from cross line 86 through contact DBT1, winding 70 of contactor 2DBM, contact HM5, contact LM6, contact RC5, contact DUV3 and contact AUV3 to wire 88. Contactor 2DBM operates to close its contact 2DBM1. The closing of contact 2DBM1 shorts out a section of resistor 116 allowing stator 1 to be energized initially with a strong D.C. current from rectifier 95.

Current also flows from cross line 86 through contact 2CR2, winding 71 of contactor 1CR, contact DUV3 and contact AUV3 to wire 88. This causes contactor 1CR to operate and close its contacts 1CR1 and 1CR2.

Contactor M is operated by current flowing through contact 28, bar contact 51, cross line 85, winding 67 of contactor M, contact DUV3 and contact AUV3 to wire 88. Contactor M operates to close its contacts M1 to M3.

As described, closing of contacts 1DBM1 and 1DBM2 connects stator 1 so it is energized with direct current from wires 109 and 110. This current flows from wire 109 through wire 111, winding 102 of current contactor 2BCR, wire 112, contact 1DBM1, wire 113, stator 1, wire 115, contact 1DBM2 and wire 114 to wire 110.

The current flowing through winding 102 of current contactor 2BCR operates it to close contact 2BCR1. Also, this current flow ensures that stator 1 will be energized with D.C. current which produces a braking torque before winding 14 of friction brake B is energized to release the motor.

The closing of contact 1DBM4 connects contactor 1AM to be operated by current flowing through contact 23, bar contact 46, cross line 80, winding 61 of contactor 1AM, contact 1DBM4, contact DUV4 and contact AUV4 to wire 88. Contactor 1AM in operating closes its contacts 1AM1 to 1AM4. The closing of contacts 1AM1, 1AM2 and 1AM3 short out resistance sections R4, R10 and R16, respectively, from the secondary circuit of rotor 2.

The closing of contact 1CR2 connects contactor 3AM to be operated by current flowing through contact 24, bar contact 47, cross line 81, contact 1CR1, winding 63 of contactor 2AM, contact 1DBM4, contact DUV4 and contact AUV4 to wire 88. Contactor 2AM operates to close contacts 2AM1 to 2AM4. The closing of contacts 2AM1, 2AM2 and 2AM3 shorts out resistance sections R3, R9 and R15, respectively, from the secondary circuit of rotor 2.

The closing of contact 1CR2 connects contactor 3AM to be operated by current flowing through contact 25, bar contact 48, cross line 82, contact 1CR2, winding 64 of contactor 3AM, contact DUV4 and contact AUV4 to wire 88. Contactor 3AM operates to close contacts 3AM1 to 3AM3 and open contacts 3AM4 and 3AM5. The closing of contacts 3AM1, 3AM2 and 3AM3 shorts out resistance sections R2, R8 and R14, respectively, from the secondary circuit of the main motor.

The closing of contact 2BCR1 connects winding 100 of contactor BR to be energized by current flow from wire 96 to wire 98 and close contacts BR1 to BR4.

The closing of contacts BR1 and BR2 connects winding 14 of friction brake B to allow current to flow from wire 96 through contact BR1, winding 14 of friction brake B, contact BR2 and resistor 103 to wire 97. Friction brake B is energized and releases the main motor and the ancillary motor. This allows them to be rotated by the overhauling load, retarded only by the braking torque produced by the main motor due to its stator 1 being energized by D.C. current from rectifier 95.

As the main motor rotates, it produces an A.C. current in the secondary circuit of rotor 2. This current is rectified by the three phase rectifier and flows therefrom, through wire 109, wire 111, winding 102 of current contactor 2BCR, wire 112, contact 1DBM1, wire 113, stator 1, wire 115, contact 1DBM2 and wire 114 to wire 110. The current produced will be proportional to the speed at which rotor 2 is rotating and high since most of the resistance is shorted from the secondary circuit.

This D.C. current causes stator 1 to produce additional dynamic braking torque against the lowering of the load. Also, the braking due to this current is proportional to the downward speed of the load. It is varied at the different speed points by changing the value of the resistance connected in the secondary circuit of rotor 2.

The closing of contact 2AM4 connects timing contactor 1T so its winding 60 is energized by current flowing from wire 89 through contact 1AM4, winding 60 of timing contactor 1T, contact DBA4, contact DUV2 and contact AUV2 to wire 88. After the elapse of the time interval after the energization of winding 60, timing contactor 1T will operate to close its contacts 1T1 and 1T2.

The closing of contact 2AM4 connects timing contactor 2T so its winding 62 is energized by current flow through wire 89, contact 2AM4, winding 62 of timing contactor 2T, contact DUV4 and contact AUV4 to wire 88. After the elapse of the time interval after the energization of winding 62, timing contactor 2T will operate to close contacts 2T1 and 2T2.

When the time interval after the energization of winding 69 of timing contactor DBT elapses, contact DBT1 opens.

Since contact DBT1 is connected in the circuit energizing winding 70 of contactor 2DBM, contactor 2DBM will restore to open contact 2DBM1. This causes all of resistor 116 to be reinserted in the current path from wire 96 to wire 109 and thereby decrease the D.C. current flowing from rectifier 95 to stator 1.

The main motor is connected with a minimum value of resistance in the secondary circuit of rotor 2 and the secondary circuit is connected to supply a D.C. current proportional to the lowering speed of the load to stator 1. Stator 1 is also energized by D.C. current from the output of rectifier 95 through resistor 116.

The ancillary motor is not connected to the A.C. supply line nor does it have stator 6 energized with a D.C. current and therefore, it merely idles.

It is seen that if the load is large, it will overhaul rotor 2 at a high rate to produce a high current in the secondary circuit. This high current is fed back to stator 1 to produce a braking torque which slows down the downward movement of the load. However, if the load is small, it will overhaul the motor at a much slower rate which produces a smaller current in the secondary circuit. This smaller current is fed back as D.C. current to stator 1 and produces a smaller braking torque against the downward movement of the load. Thereby, the downward movement of the load is held at a substantially constant rate completely independent of the load on the hook.

On going to the second point lowering L$b$, the rotating condition described for the first point lowering L$a$ remains the same except that resistance sections R2, R8 and R14 are reinstated in the secondary circuit of rotor 2 and the ancillary motor is connected to drive the load downward. This is accomplished as follows.

Contact 25 disengages from bar contact 48 to de-energize winding 64 of contactor 3AM. Contactor 3AM restores to open contacts 3AM1 to 3AM3 and close contacts 3AM4 and 3AM5. The opening of contacts 3AM1, 3AM2 and 3AM3 reinserts resistance sections R2, R8 and R14, respectively, back into the secondary circuit of rotor 2.

Contactor LA is operated by current flowing from contact 22, bar contact 45, cross line 79, contact BR4, contact HA5, winding 59 of contactor LA, contact DBA4, contact DUV2 and contact AUV2 to wire 88. Contactor LA operates to close contacts LA1 to LA3 and open contacts LA4 and LA5. The closing of contacts LA1 to LA3 connects stator 6 of the ancillary motor to mains 3, 4 and 5 to drive rotor 7 in the lowering direction.

Even though the load is being driven downward by the ancillary motor, the secondary circuit of rotor 2 is still connected to supply the current developed therein as D.C. current to stator 1. Also, the output of rectifier 95 is connected to energize stator 1. As before stated, this D.C. current produces a braking torque against the driving force of the ancillary motor and the downward movement of the load.

On going to the third point lowering L$c$, the operating conditions described for the second point lowering L$b$ remain the same except that resistance sections R3, R9 and R15 are reinserted in the secondary circuit of rotor 2 and the accelerating contactors are put under the control of the contacts of their respective timing contactors for return operation of drum controller 16. This is accomplished as follows.

Contact 24 moves from bar contact 47 to de-energize winding 63 of contactor 2AM. Contactor 2AM restores to open contacts 2AM1 to 2AM4. The opening of contacts 2AM1, 2AM2 and 2AM3 reinserts resistance sections R3, R9 and R15, respectively, back into the secondary circuit of rotor 2.

With more resistance in the secondary circuit of rotor 2, less current will flow therefrom through the afore-described path to stator 1 to provide less braking torque. Therefore, the lowering speed of the load increases due to its weight and the driving torque of the ancillary motor.

The opening of contact 2AM4 de-energizes winding 62 of timing contactor 2T and it restores to open contacts 2T1 and 2T2 immediately.

Contactor 2CR is operated by current flow through contact 30, bar contact 53, cross line 87, winding 72 of contactor 2CR, contact DUV3 and contact AUV3 to wire 88. Contactor 2CR operates to close contact 2CR1 and open contact 2CR2. The opening of contact 2CR2 opens the circuit energizing winding 71 of contactor 1CR and contactor 1CR restores to open contacts 1CR1 and 1CR2. The closing of contact 2CR1 connects winding 72 of contactor 2CR to be energized by current from wire 86.

Contactor 2CR will remain energized should drum controller 16 be returned to either lowering point La or Lb even though contact 30 leaves bar contact 53. This compels that contactors 2AM and 3AM be energized solely through contacts 1T1 and 2T1 of timing contactors 1T and 2T, respectively, and not through contacts 1CR1 and 1CR2. This gives timed deceleration of the load to the lower lowering speeds.

On going to the fourth point lowering Ld, the operating conditions described for the third point lowering remain the same except that resistance sections R20, R22 and R24 are shorted out from the secondary circuit of rotor 7. This is accomplished as follows.

Contactor 1AA is operated by current flow through contact 26, bar contact 49, cross line 83, contact 1T2, winding 65 of contactor 1AA, contact DUV4 and contact AUV4 to wire 88. Contactor 1AA operates to close contacts 1AA1 and 1AA2 which short out resistance sections R20, R22 and R24 from the secondary circuit of rotor 7. This allows the ancillary motor to accelerate to a higher speed and drive the load downward faster. It is to be pointed out that the same compensated braking circuit as described for the third point lowering Lc is still connected between the secondary of rotor 2 and stator 1 of the main motor.

On the fifth point lowering Le, the compensated braking circuit for the main motor is disconnected and the main motor is connected to assist the ancillary motor in driving the load downward with timed acceleration. The circuit for the ancillary motor remains the same except that the resistance sections R19, R21 and R23 are reconnected into the secondary circuit of rotor 7 and the ancillary motor is then accelerated with timed acceleration to assist in driving the load downward. This is accomplished as follows.

Contactor RC is operated by current through contact 21, bar contact 44, cross line 78, winding 58 of contactor RC, contact DUV2 and contact AUV2 to wire 88. Contactor RC operates to close contacts RC1 to RC3 and open contacts RC4 and RC5. The closing of contacts RC1, RC2 and RC3 connects the secondary circuit of rotor 2 in a star point.

Winding 68 of contactor 1DBM and winding 69 of timing contactor DBT are de-energized because contact 29 leaves bar contact 52 to interrupt the flow of current therethrough. Contactor 1DBM restores to open contacts 1DBM1 and 1DBM2 and close contacts 1DBM3 and 1DBM4. Timing contactor 1DBT restores to close contact 1DBT1.

The opening of contacts 1DBM1 and 1DBM2 disconnects the circuit supplying D.C. current to stator 1 of the main motor. This de-energizes the winding 102 of contactor 2BCR and it restores to open contact 2BCR1.

The closing of contact 1DBM3 and RC4 connects winding 57 of contactor LM to be energized by the current through contact 20, bar contact 43, cross line 77, contact HM6, winding 57 of contactor LM, contact 1DBM3, contactor RC4, contact DUV2 and contact AUV2 to wire 88. Contactor LM operates to close contacts LM1 to LM4 and open contacts LM5 and LM6. The closing of contacts LM1 to LM3 connects stator 1 of the main motor to be energized from supply mains 3, 4 and 5. The main motor is thus connected to drive the load downward.

When contactor LM operates to close contacts LM1 to LM3, current flows through winding 101 of contactor 1BCR causing it to operate and close contact 1BCR1.

In the time interval between the opening of contact 2BCR1 and the closing of contact 1BCR1, contactor BR would restore to open contacts BR1 to BR4 and the circuit energizing winding 14 and set friction brake B if other means were not provided. The restoring of contactor BR is prevented as follows.

Connected in parallel across winding 100 of contactor BR by means of wires 123 and 124 is a contact M3, a condenser 125 and a resistor 126. Connected in parallel with condenser 125 and resistor 126 is a second resistor 127. During the time that winding 100 of contactor BR is energized from wires 96 and 97, condenser 125 will take on a charge. During the time interval between the opening of contact 2BCR1 and the closing of contact 1BCR1, condenser 125 will discharge its stored energy by current flow through contact M3, wire 123, winding 100 of contactor BR, wire 124 and resistor 126 back to condenser 125. This current flow maintains contactor BR operated for the desired length of time.

Resistor 127 is connected in parallel with condenser 125 and resistor 126 to provide a path for the discharge of condenser 125 when contact M3 is opened.

When contact 1DBM4 opens, it opens the circuit energizing winding 61 of contactor 1AM. Contactor 1AM restores to open contacts 1AM1 to 1AM4. The opening of contacts 1AM1, 1AM2 and 1AM3 reinserts resistance sections R4, R10 and R16 in the secondary circuit of rotor 2.

The opening of contact 1AM4 opens the circuit energizing winding 60 of timing contactor 1T and it restores to open contacts 1T1 and 1T2.

The opening of contact 1T2 opens the circuit energizing winding 65 of contactor 1AA and it restores to open contacts 1AA1 and 1AA2 and reinsert resistance sections R20, R22 and R24 in the secondary circuit of the ancillary motor.

However, as soon as contactor LM becomes energized, contact LM4 closes and winding 61 of contactor 1AM is re-energized by current flow through contact 23, bar contact 46, cross line 80, winding 61 of contactor 1AM, contact LM4, contact DUV4 and contact AUV4 to wire 88. Contactor 1AM operates to close its contacts 1AM1 to 1AM4.

The closing of contacts 1AM1, 1AM2 and 1AM3 again short resistance sections R4, R10 and R16 out of the secondary circuit of rotor 2.

The closing of contact 1AM4 connects timing contactor 1T so current flows through wire 89, contact 1AM4, winding 60 of timing contactor 1T, contact DBA4, contact DUV2 and contact AUV2 to wire 88. As before mentioned, timing contactor 1T has a time interval between the energization of its winding and the closing of its contacts. This timing interval is sufficient to allow the main motor to accelerate up to speed.

After the time interval has elapsed, contacts 1T1 and 1T2 become closed.

The closing of contact 1T1 connects winding 63 of contactor 2AM so it is energized by current through contact 25, bar contact 48, cross line 82, contact 1T1, winding 63 of contactor 2AM, contactor LM4, contact DUV4 and contact AUV4 to wire 88. Contactor 2AM operates to close contacts 2AM1 to 2AM4. The closing of contacts 2AM1, 2AM2 and 2AM3 short out resistance sections R3, R9 and R15, respectively, from the secondary circuit of rotor 2. The main motor now accelerates to a higher lowering speed.

The closing of contact 1T2 connects winding 65 of contactor 1AA to be energized by current through contact 26, bar contact 49, cross line 83, contact 1T2, winding 65 of contactor 1AA, contact DUV4 and contact AUV4 to wire 88. Contactor 1AA operates to close its contacts 1AA1 and 1AA2 to short out resistance sections R20, R22 and R24 from the secondary circuit of rotor 7 so the ancillary motor can also accelerate to the same higher lowering speed.

Thus, both the main and the ancillary motor are accelerated to the same higher lowering speed.

The closing of contact 2AM4 connects winding 62 of timing contactor 2T and it is energized by current flow through wire 89, contact 2AM4, winding 62 of contactor 2T, contact DUV4 and contact AUV4 to wire 88. After the time interval has elapsed, contacts 2T1 and 2T2 close.

The closing of contact 2T1 connects winding 64 of contactor 3AM to be energized by current flow through contact 25, bar contact 48, cross line 82, contact 2T1, winding 64 of contactor 3AM, contact DUV4 and contact AUV4 to wire 88. Contactor 3AM operates to close its contacts 3AM1 to 3AM4 and open contacts 3AM4 and 3AM5. The closing of contacts 3AM1, 3AM2 and 3AM3 short out resistance sections R2, R8 and R14, respectively, from the secondary circuit of rotor 2 and the main motor accelerates to its maximum lowering speed.

The closing of contact 2T2 connects winding 66 of contactor 2AA to be energized by current flow through contact 27, bar contact 50, cross line 84, contact 2T2, winding 66 of timing contactor 2AA, contact DUV4 and contact AUV4 to wire 88. The closing of contactor 2AA closes contacts 2AA1 and 2AA2 which short out resistance sections R19, R21 and R23 from the secondary circuit of rotor 7 and the ancillary motor accelerates to the same maximum lowering speed.

Thus, it is shown how both motors are connected to drive the load downward and how they automatically accelerate from their lowest speed to their maximum speed with full timed control.

Should drum controller 16 be moved from the fifth point lowering Le to any of the intermediate lowering points, then, automatic decelerating dynamic braking will take place in the reverse of the aforedescribed action to the final lowering speed. The final speed depends upon the selected lowering point. That is, timed deceleration is obtained to gradually slow down the lowering speed of the load and to prevent the motor supplying braking torque from receiving a terrific slug of D.C. braking current.

Should the drum controller 16 be moved from any of the hoisting or the lowering points to the "off" position, the contactors will all be restored to their normal condition and the friction brake B will set to stop the load immediately.

FIGURE 3 illustrates the addition necessary to the control circuit of FIGURE 2 in order to obtain dynamic braking in the "off" position of drum controller 16. This is accomplished as follows.

A normally closed contact M4 must be added to contactor M.

A timing contactor T having a winding 128 and normally closed contact T1 is connected to be energized by current going through wire 89, contact M4, wire 129, winding 128 of timing contactor T, contact DUV3 and contact AUV3 to wire 88. After the elapse of a time interval, contact T1 opens.

Contact T1 is connected between wire 129 and wire 87A by wires 130 and 131.

When drum controller 16 is returned to the "off" position from either a hoisting or lowering point, contactor M restores to close its normally closed contact M4. The closing of contact M4 connects timing contactor T to wire 87 and its winding 128 is energized as described above.

At the same time, winding 73 of contactor DBA is energized by current flowing through wire 89, contact M4, wire 129, wire 130, contact T1, wire 131, wire 87A, contact HA4, contact LA4, winding 73 of contactor DBA, contact DUV3 and contact AUV3 to wire 88. Contactor DBA operates to close contacts DBA1 to DBA3 and opens contacts DBA4 and DBA5.

The closing of contacts DBA1 and DBA2 connects stator 6 to wires 96 and 97 and stator 6 is energized with D.C. current, as before described, to produce a braking torque. This braking torque assists the braking torque supplied by the setting of friction brake B to rapidly stop movement of the load.

After the time interval for timing contactor T has elapsed, contact T1 opens, opening the circuit energizing winding 73 of contactor DBA, and contactor DBA restores opening contact DBA1 to DBA3 and closing contacts DBA4 and DBA5.

The opening of contacts DBA1 and DBA2 disconnects the flow of D.C. current to stator 6 and the ancillary motor stops producing the braking torque.

Figure 5:
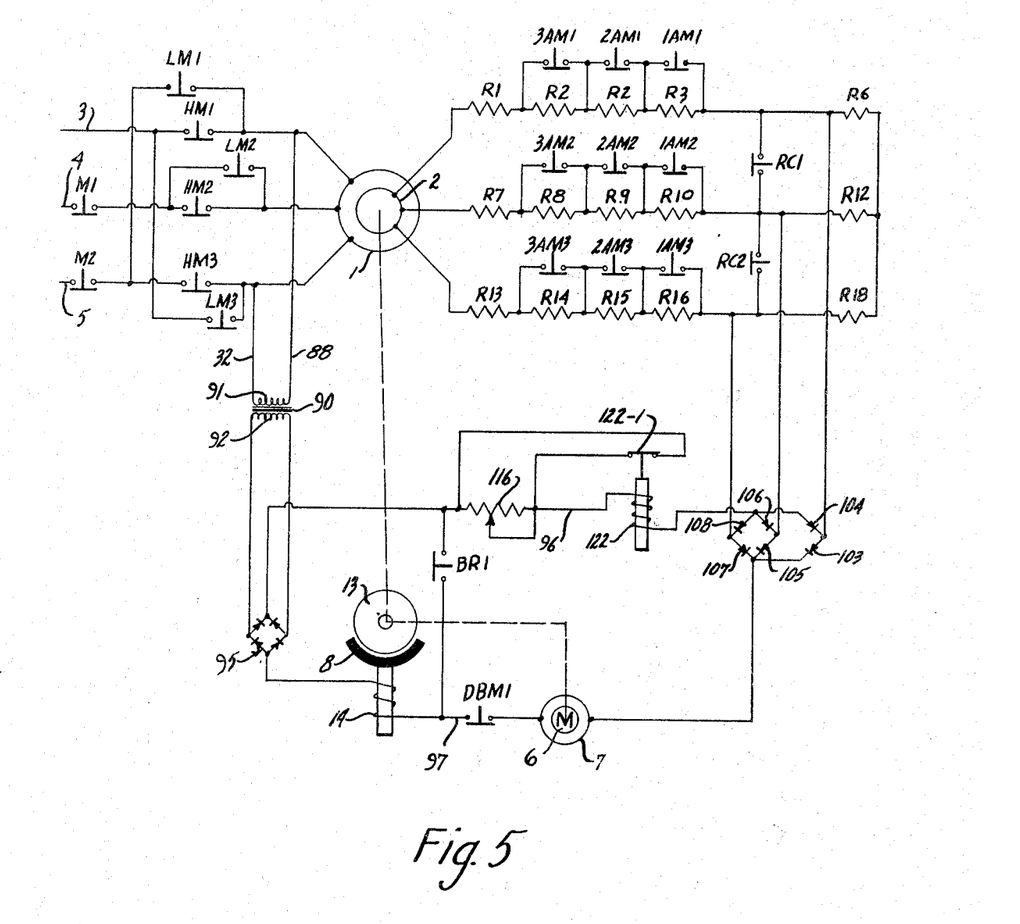
FIGURE 5 is an across-the-line schematic circuit similar to FIGURE 1 employing an A.C. motor as an eddy current brake.

FIGURE 5 illustrates an embodiment of the invention employing an A.C. motor connected in circuit solely as an eddy current brake without means to permit motoring as in the previous embodiments. Generally, the connection of the main driving motor and the rotor feedback circuit is similar to that shown in FIG. 1 and corresponding elements are similarly numbered for simplicity and clarity of explanation. A few revisions made in the basic circuit are described to show further modifications which can be made in accordance with the broad concepts of the present invention.

In FIGURE 5, the rectifier 95 and the feedback rectifier formed by elements 103–108 inclusive are connected between lines 96 and 97. However, in FIGURE 5, the rectifiers are connected with similar polarization rather than opposing as in FIGURE 1.

Referring particularly to FIGURE 5, the magnetic brake B has its winding 14 connected in series in line 97 and across rectifier 95 through a set of brake contacts BR1 which are connected between line 96 and 97 and can be operated in the same manner as the brake release contacts of the previous circuit. During the initial starting of the circuit, the friction brake will thus be released as a result of the closing of the brake contacts BR1. The A.C. motor has its stator 6 also connected in series in line 97 with dynamic braking contacts DBM1 connected between winding 14 and the stator 6. Resistor 116 is connected in line 96 between the rectifier 95 and the feedback rectifier formed by rectifying elements 103–108 inclusive. A relay 122 is connected in line 96 and includes a set of normally closed contacts 122–1 connected in parallel with the variable resistor.

In operation, the initial closing of the brake relay contacts BR1 and the dynamic braking contacts DBM1 causes simultaneous energization of the friction brake B and the eddy current brake formed by the motor stator 6 and the rotor 7. At the initial starting, the motor stator 1 is energized and produces a rectified output current which flows from the rectifier through stator 6, the closed contacts DBM1 and BR1, the normally closed contacts 122–1 of the relay 122 and the relay winding back to the feedback rectifier. As a result, the magnetic brake is released and the eddy current brake is energized with a minimum safe excitation to prevent dropping of the load unit. The bypassing of the resistor 116 increases the energization of the braking motor to maintain a maximum holding at the start.

The hoist begins to turn at a slow speed and will run at a speed such that the braking motor holds the load created by motoring action of the drive motor 1 and/or an overhauling load. The excitation current for the braking motor is solely from the feedback rectifying circuits. The process continues as the rotor resistance is cut out of the circuit to increase the hoist speed as rotor current in the rotor 2 gradually decreases until at synchronous speed the rotor current is zero.

However, should the speed tend to rise above the synchronous speed of the motor, it will act as an induction generator and current again flows in the circuit of rotor 2. This in turn generates an increasing direct current excitation of stator 6 of the braking motor. Thus, as the rotor current increases, the energization of the eddy current braking motor increases and provides an intrinsically safe operating circuit.

Thus, the circuit of FIGURE 5 generally functions as the circuit of FIGURE 1 when the motor is energized to provide motoring or driving action and the motor 6 to provide a braking motor. In FIGURE 5 however the friction brake and the braking motor are connected in series rather than in the parallel arrangement shown in FIGURE 1.

If desired, the circuit of FIGURE 1 can be modified to eliminate the incoming motor connection such that the motor 6 is employed merely as a braking motor and thus corresponding essentially to the functioning of an eddy current brake. Further, the braking motors may be wound rotor motors as specifically shown in FIGURE 1 or any other suitable induction motor such as a squirrel cage motor.

The present invention thus provides a relatively simple and reliable means for producing a dual motor hoist system and the like in an inexpensive and flexible manner with the systems being readily adapted to the varying requirements of installations and applications.

Various modes of carrying out the invention are contemplated as being within the scope of the following claims particularly pointing out and distinctly claiming the subject matter which is regarded as the invention.

I claim:

1. A hoist system for positioning a load, comprising power supply mains, a pair of motors having rotors mechanically coupled together for coupling to the load and having stators, each of said motors having a stator circuit and a rotor circuit, energizing of the stator circuit with alternating current producing a drive torque and with direct current producing a brake torque, a source of direct current including a first means connected to the power supply mains and a second means connected to the rotor circuit of the first motor, and control means including contacts and circuits for connecting the stator circuits to the power supply mains and to the source energizing said motors in a plurality of modes including a first mode wherein both stators are connected to the power supply mains to provide a positive drive torque, a second mode wherein only one stator is connected to the power supply mains to alone drive the load, a third mode wherein one motor is connected to drive the load and the other motor is connected to brake the load, and a fourth mode wherein one motor is connected to brake the load and the other motor is inactive.

2. The hoist system in accordance with claim 1 having rotor impedances connected in the respective rotor circuits by said control means to adjust the drive torque and the brake torque in any of the defined modes.

3. A dual motor hoist system, comprising power supply lines, a first alternating current hoist motor, a second alternating current hoist motor coupled to the first motor, means to selectively connect the motors to incoming power supply lines, a rectifier means and means connecting said rectifier means to a source of alternating current to provide a direct current source, means to selectively connect one of the motors to the incoming power lines to provide a driving torque and to said rectifier means to provide braking torque, said means including a current varying means to adjust the level of the direct current from the rectifier means and thereby the level of braking torque, and timing means to actuate said current varying means to establish an initial high level of direct current and to subsequently reduce the level of direct current.

4. A dual motor hoist system, comprising power supply mains constituting a first source of alternating current power, a pair of hoist motors having their rotors interconnected for coupling to a load and having stators for connection to an alternating current power for producing a driving torque and for connection to a direct current power for producing a braking torque, said motors having a rotor circuit constituting a second source of alternating current power, rectifier means connected to one of said alternating current power sources to provide a direct current, timing means interconnected in circuit with said rectifier means and the stator of one of said motors, and control means for disconnecting said motors from the power supply mains and simultaneously actuating the timing means to provide timed energization of the corresponding stator.

5. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, and control means to selectively connect the stators of the motors to incoming power lines to provide a driving torque and to said rectifier means to provide braking torque, said control means including current varying means for varying the braking torque.

6. A hoist system for positioning a load, comprising alternating current power supply mains, a first alternating current motor and a second substantially identical alternating current motor interconnected to conjointly position a load, each of said motors having a stator and providing a motor torque when energized with alternating current power and a braking torque when energized with a direct current power, a rectifying circuit connected to the output of the first motor, a control means including contacts and circuits controlled by said contacts for energizing the motors and including contact means for selectively interconnecting a first of the motors to the supply mains for providing a positive driving torque and the second of the said motors to the rectifying circuit for generating a braking torque, said control means including current varying means for varying the braking torque.

7. The hoist system of claim 6 wherein said motors including induction wound rotors interconnected and coupled to mechanically position a load.

8. A dual motor hoist system for positioning a load, comprising power supply lines, a first alternating current wound rotor motor having a stator and a rotor for coupling to the load, said first motor having a selected speed at which rotor current is essentially zero and constituting a generator at speeds above said speed, a second alternating current wound rotor motor having a stator and a rotor mechanically coupled to the first motor, said motors being identically constructed, means to connect the stator of the first motor to the incoming power supply lines, a first rectifier means connected to the output of the first motor, a second rectifier means connected to the incoming power supply lines, and means connecting the rectifier means to the stator of the second motor to produce similar current flow therethrough to provide braking torque, said last-mentioned means including current varying means for varying the braking torque.

9. A hoist system for positioning a load, comprising alternating current power supply mains, a first alternating current motor and a second alternating current motor interconnected to conjointly position a load, each of said motors having a field winding circuit and a rotor winding circuit and providing motor action when the field winding circuit is energized with alternating current and a braking action when the field winding circuit is energized with a direct current, rectifier means connected in the rotor winding circuit of one motor to produce a direct current power source proportional to the speed of the rotor, control means including contacts and circuits controlled by said contacts for energizing the motors and including contact means for selectively interconnecting the primaries of the first and second motors to the supply means for providing a positive driving torque and means including current varying means connecting the output of said rectifier means directly to the primary of the other of said motors to provide a braking torque.

10. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and a normally set friction brake having a winding connected to the output of said rectifier means and including contact means connected to hold the winding de-energized and means responsive to energization of the first alternating current motor by power from the rectifier means to control said contact means to prevent release of the friction brake in the absence of direct current to the first motor with the control mean set to energize the first motor for braking torque.

11. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, dynamic braking contacts directly connecting the second rectifier means to the output of the second motor, dynamic braking contacts directly connecting the first rectifier means to the input of the first motor, and circuit means connecting said rectifier means in parallel to a pair of control lines with current varying means connected in series in one of said lines between said direct connections.

12. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a hoist speed connecting only the first motor to the power supply lines and a high impedance in the rotor circuit thereof and connecting the second motor to the rectifier means and a low impedance in the rotor circuit.

13. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a hoist speed connecting only the first motor to the power supply and a medium impedance in the rotor circuit thereof and connecting the second motor to the rectifier means and a high impedance in the rotor circuit thereof.

14. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a hoist speed connecting both of said motors to the power supply lines and a medium impedance in the rotor circuit of the first motor and high impedance in the rotor circuit of the second motor.

15. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a hig impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a hoist speed connecting both of said motors to the power supply lines and a low impedance in the rotor circuit of both motors.

16. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a hoist speed connecting both of said motors to the power supply lines and the first motor has a minimum impedance and the second motor has the impedance short circuited.

17. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a lower speed connecting a minimum impedance in the rotor circuit of the first motor and the stator thereof to the rectifier means to provide a braking torque and disconnecting the second motor completely and permitting the second motor to idle.

18. A dual hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a lowering speed connecting a low rotor impedance in the rotor circuit of the first motor and connecting the stator thereof to the rectifier means to provide a braking torque and connecting the second motor to the power supply mains and with a high impedance in the rotor circuit thereof.

19. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a lowering speed connecting a medium impedance in the rotor circuit of the first motor and connecting the stator thereof to the rectifier means to provide a braking torque and connecting the second motor to the power supply mains and with a high impedance in the rotor circuit thereof.

20. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected as a high impedance, medium impedance, low impedance and minimum impedance in the output circuit of the rotor for the first motor and as a high impedance and low impedance in the output circuit of the rotor of the second motor and controlled by the control means, said control means being presettable in a plurality of positions and in one of said positions corresponding to a lowering speed connecting a medium rotor impedance in the rotor circuit of the first motor and connecting the stator thereof to the rectifier means to provide a braking torque and connecting the second motor to the power supply mains and with a low rotor impedance in the rotor circuit thereof.

21. A dual motor hoist system for positioning a load, comprising power supply lines, a first alternating current hoist motor having a stator and a rotor for coupling to the load, a second alternating current hoist motor having a stator and a rotor mechanically coupled to the first motor, said rotors having rotor windings establishing an alternating current output, means to selectively connect the stators of the motors to the incoming power supply lines, a first rectifier means connected to the rotor winding of the first motor, a second rectifier means connected to the incoming power supply lines, control means to selectively connect the stators of the motors to incoming power lines to provide a driving torque and to said rectifier means to provide braking torque, and adjustable impedances connected in the output circuit of each rotor and controlled by the control means, said control means being presettable in a plurality of positions and in one of said positions corresponding to a lowering speed connecting both motors to the power supply lines to drive the load with a positive torque.

22. The dual motor hoist system of claim 21 having timing means to control the rotor impedance connections to provide a timed acceleration of the load.

23. A hoist system for positioning a load, comprising alternating current power supply mains, a first alternating current motor and a second substantially identical alternating current motor interconnected to conjointly position a load, each of said motors having a stator and providing a motor torque when energized with alternating current power and a braking torque when energized with a direct current power, a rectifying circuit connected to the output of the first motor, a control means including contacts and circuits controlled by said contacts for energizing the motors and including contact means for selectively interconnecting a first of the motors to the supply mains for providing a positive driving torque and the second of the said motors to the rectifying circuit for generating a braking torque, a second rectifying circuit connected to the power supply lines, and a friction brake coupled to said motors and connected to said second rectifying circuit for energization.

24. A dual motor hoist system for positioning a load, comprising power supply lines, a first alternating current wound rotor motor having a stator and a rotor for coupling to the load, said first motor having a selected speed at which rotor current is essentially zero and constituting a generator at speeds above said speed, a second alternating current wound rotor motor having a stator and a rotor mechanically coupled to the first motor, said motors being identically constructed, means to connect the stator of the first motor to the incoming power supply lines, a first rectifier means connected to the output of the first motor, a second rectifier means connected to the incoming power supply lines, a series circuit including the two rectifier means in series with the stator of the second motor and a controlling impedance means, and a current responsive device, said current responsive device controlling contacts connected to selectively insert and remove said impedance means.

25. The dual motor hoist system of claim 24 having a friction brake with a release winding connected in said series circuit, and a set of release contacts connected in parallel with the second rectifier means and the release winding.

References Cited by the Examiner

UNITED STATES PATENTS

| | | | |
|---|---|---|---|
| 2,312,592 | 3/1943 | Seeger et al. | 318—46 |
| 2,497,492 | 2/1950 | Dyer | 318—87 X |
| 2,525,541 | 10/1950 | Grepe | 318—212 |
| 2,687,505 | 8/1954 | Schurr | 318—209 |
| 2,982,897 | 5/1961 | Eastcott | 318—46 |
| 3,039,034 | 6/1962 | Lee | 318—48 |

FOREIGN PATENTS

| | | |
|---|---|---|
| 530,757 | 9/1956 | Canada. |
| 676,132 | 7/1952 | Great Britain. |

ORIS L. RADER, *Primary Examiner.*

T. LYNCH, *Assistant Examiner.*

UNITED STATES PATENT OFFICE
CERTIFICATE OF CORRECTION

Patent No. 3,319,142                                      May 9, 1967

Frederick Yorke Grepe

It is hereby certified that error appears in the above numbered patent requiring correction and that the said Letters Patent should read as corrected below.

Column 1, line 48, for "monitoring" read -- motoring --; column 2, line 51, for "drievs" read -- drives --; column 10, line 74, for "1CR2" read -- 1CR1 --; same line 74, for "3AM" read -- 2AM --; column 11, line 44, for "2AM4" read -- 1AM4 --; column 21, line 42, after "dual" insert -- motor --.

Signed and sealed this 15th day of October 1968.

(SEAL)
Attest:

Edward M. Fletcher, Jr.                           EDWARD J. BRENNER Attesting Officer                                          Commissioner of Patents